United States Patent
Madkour et al.

(10) Patent No.: US 7,012,977 B2
(45) Date of Patent: Mar. 14, 2006

(54) SYSTEM, METHOD AND APPARATUS FOR WIRELESS CHANNEL PARAMETER ESTIMATION IN SPREAD SPECTRUM COMMUNICATION SYSTEMS

(75) Inventors: Mohamed F. Madkour, Dallas, TX (US); Yi Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 953 days.

(21) Appl. No.: 09/885,804

(22) Filed: Jun. 20, 2001

(65) Prior Publication Data

US 2002/0085623 A1 Jul. 4, 2002

Related U.S. Application Data

(60) Provisional application No. 60/258,924, filed on Dec. 29, 2000.

(51) Int. Cl.
*H03D 1/04* (2006.01)

(52) U.S. Cl. ............... 375/346; 375/148; 375/144; 455/296

(58) Field of Classification Search ............... 375/346, 375/148, 144; 455/296, 278.1
See application file for complete search history.

(56) References Cited

U.S. PATENT DOCUMENTS

| | | | |
|---|---|---|---|
| 4,878,251 A * | 10/1989 | Richardson | 455/206 |
| 5,537,443 A * | 7/1996 | Yoshino et al. | 375/340 |
| 5,905,946 A * | 5/1999 | Lilleberg et al. | 455/63.1 |
| 6,009,089 A | 12/1999 | Brink et al. | |
| 6,172,969 B1 * | 1/2001 | Kawakami et al. | 370/342 |
| 6,501,788 B1 * | 12/2002 | Wang et al. | 375/148 |
| 6,574,270 B1 * | 6/2003 | Madkour et al. | 375/148 |
| 2003/0012217 A1 * | 1/2003 | Andersson et al. | 370/437 |

FOREIGN PATENT DOCUMENTS

| EP | 1 041 727 A | 10/2000 |
|---|---|---|
| WO | WO 00 55992 A | 9/2000 |

OTHER PUBLICATIONS

Madkour, Mohamed F. Gupta, S.C., Wang, Yi-Pin E., A Novel Downlink Blind Interference Cancellation in a W-CDMA Mobile Communications System, Proceedings of the IEEE Wireless Communications and Networking Conference, WCNC '99, New Orleans, Sep. 21-25, 1999.

(Continued)

*Primary Examiner*—Temesghen Ghebretinsae (57) ABSTRACT

The present invention provides a system, method and apparatus for estimating channel parameters in spread spectrum communication systems. A first method is accomplished by receiving a base station signal and then demodulating the base station signal. After demodulating the base station signal, a maximum signal is selected from the base station signal. If the maximum signal is the common pilot channel, then the channel parameters are estimated directly from the common pilot channel. If the maximum signal is not the common pilot channel, then the demodulated base station signal is iteratively fed back for further demodulation and re-selection of the maximum signal until the maximum signal is the common pilot channel. A second method is accomplished by incorporating channel estimates made from the interfering signals in a constructive manner to the first method.

24 Claims, 7 Drawing Sheets

OTHER PUBLICATIONS

Madkour, Mohamed F., Gupta,. S.C., Wang, Yi-Pin E., A Subspace Projection Based Blind Interference Cancellation Scheme for W-CDMA Downlink, Proceedings of the 33$^{rd}$ Asilomar Conference, Pacific Grove, CA, Oct. 24-27, 1999.

Hottinen, Ari, Holma, Harri, Toskala, Antti, Multi-User Detection for Multirate CDMA Communications, Nokia Research Center, Irving, Texas, USA and Helsinki, Finland, IEEE, 1996 pp 1819-1823.

Juntti, Markku K., System Concept Comparisons for Multirate CDMA with Multiuser Detection, University of Oulu, Telecomm Lab., Oulu, Finland, 1998 VIC '98 IEEE, pp. 36-40.

Johansson, Ann-Louise, Svensson, Arne, Successive Interference Cancellation in Multiple Data Rate DS/CDMA Systems, Chalmers University of Technology, Department of Information Theory, Gothenburg, Sweden, 1995 IEEE pp. 704-708.

Patel, Pulin, Holtzman, Jack, Analysis of a Simple Successive Interference Cancellation Scheme in a DS/CDMA System, IEEE Journal of Selected Areas in Communications, vol. 12, No. 5, Jun. 1994, pp796-807.

* cited by examiner

SYSTEM, METHOD AND APPARATUS FOR WIRELESS CHANNEL PARAMETER ESTIMATION IN SPREAD SPECTRUM COMMUNICATION SYSTEMS

RELATED APPLICATIONS

This application claims the benefit of prior filed provisional patent application Ser. No. 60/258,924 filed on Dec. 29, 2000, now abandoned. This application is also related to patent application Ser. Nos. 09/235,470 to Wang et al., filed Jan. 22, 1999 and 09/364,169 to Madkour, et al., filed Jul. 30, 1999, assigned to the assignee of the present application. The disclosures of these applications are hereby incorporated herein by reference.

FIELD OF THE INVENTION

The present invention relates generally to the field of telecommunications and, more particularly, to a system, method and apparatus for wireless channel parameter estimation in spread spectrum communication systems.

BACKGROUND OF THE INVENTION

Wireless communication systems are commonly employed to provide voice and data communications to subscribers. For example, analog cellular radiotelephone systems, such as those designated AMPS, ETACS, NMT-450 and NMT-900, have long been in use successfully throughout the world. Digital cellular radiotelephone systems such as those conforming to the North American standard IS-65 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communication services such as CDPD (Cellular Digital Packet Data).

Several types of access techniques are conventionally used to provide wireless services to subscribers. Traditional analog cellular systems generally employ a system referred to as frequency division multiple access (FDMA) to create communication channels wherein discrete frequency bands serve as channels over which cellular terminals communicate with cellular base stations. These bands are often reused in geographically separate cells in order to increase system capacity. Modem digital wireless systems utilize different multiple access techniques such as time division multiple access (TDMA) and/or code division multiple access (CDMA) to provide increased spectral efficiency. In TDMA systems, such as those conforming to GSM or IS-136 standards, carriers are divided into sequential time slots that are assigned to multiple channels such that a plurality of channels may be multiplexed on a single carrier. CDMA systems, such as those conforming to IS-95, IS-200, and Wideband Code Division Multiple Access (WCDMA) standards, achieve increased channel capacity by using "spread spectrum" techniques wherein a channel is defined by modulating a data-modulated carrier signal by a unique spreading code (i.e., a code that spreads an original data-modulated carrier over a wide portion of the frequency spectrum in which the communication systems operates).

Standard spread-spectrum CDMA communication systems commonly use "direct sequence" spread spectrum modulation. In direct sequence modulations, a data-modulated carrier is directly modulated by a spreading code or sequence before being amplified by a power amplifier and transmitted over a communication medium (e.g., an air interface). The spreading code typically includes a sequence of "chips" occurring at a chip rate that normally is much higher than the bit rate of the data being transmitted. In a typical CDMA system, a data stream intended for a particular user (terminal) is first direct-sequence spread according to a user-specific spreading sequence. The resultant signal is then scrambled according to a cell-specific scrambling sequence. The spread and scrambled user data stream is then transmitted in a communications medium. Spread-spectrum signals for multiple users combine to form a composite signal in the communications medium. The channel estimation process has conventionally been accomplished by passing the received baseband signal on to a filter matched to the waveform of the pilot signal. By comparing the exact and filtered pilot signal, the channel random amplitude and phase can be estimated. The pilot signal may be a code-multiplexed pilot channel as the common channel used in IS-95, IS-2000 and WCDMA, or may be time-multiplexed pilot symbols used in some Traffic Channel configurations in WCDMA. The path time delay is assumed to be known. The desired pilot signals may be weak (for voice application) resulting in a bad channel estimate. In WCDMA, the channel parameters can also be estimated from the common pilot channel.

Downlink signals for different physical channels within a cell are transmitted from a base station in a synchronous fashion. The user-specific spreading codes are orthogonal, creating mutually orthogonal downlink signals at the transmitter. However, channel dispersion routinely results in a loss of orthogonality at the receiver, giving rise to intra-cell multi-user interference that can lead to degradation of receiver performance. In uplink signals, this interference can be intensified by the "near-far" problem (i.e., the higher contribution of energy from strong interfering signals intended for users located far from the base station than the signal intended for the desired user). Although the near-far problem can be alleviated by power control techniques on the uplink, power control does not solve the near-far problem on the downlink.

These problems may be exacerbated in "third generation" (3G) systems such as WCDMA systems. The 3G cellular mobile communication systems will support several kinds of communication services, including voice, images and even motion picture transmission. Therefore, the users will be transmitting their information signals using different data rates. Their performance requirements will vary from application to application. WCDMA with variable spreading factor (SF) and multicode modulation as a multirate scheme is emerging as one of the air interfaces for the 3G mobile communication systems. The high and different data rates and the large number of users, combined with multipath dispersive fading channels, cause severe inter-cell and intra-cell multi-user interference in both up and downlinks. This interference will limit the link capacity and/or degrades the quality of services. Moreover, the estimated wireless channel parameters will not be accurate because the pilot signal will be corrupted by the multiple access interference.

Previous work has demonstrated huge potential capacity and performance improvements as a result of using multi-user detection in spread-spectrum communications at the expense of increasing complexity of optimum structures. In general, a major problem with multi-user detectors and interference cancellers is the maintenance of simplicity.

Most current detectors are designed for the uplink. For uplink interference cancellation, it is assumed that the receiver knows all the spreading codes. However, this assumption is not true for the downlink where the mobile unit only knows its own spreading codes. Furthermore, the interference cancellation algorithms proposed to date are very complex. For the downlink, since interference cancellation has to be performed at a hand-held battery-operated terminal, cost and power consumption are of great concern.

Most proposed techniques for interference cancellation are more suitable for uplink interference cancellation because the techniques are highly complex, requiring relatively high power consumption, and/or assume prior knowledge of the spreading sequence being used in the system. Therefore, there is a need for downlink interference cancellation techniques which minimize power consumption and do not require prior knowledge of the system spreading sequence.

SUMMARY OF THE INVENTION

The present invention provides a system, method and apparatus for wireless channel parameter estimation in spread spectrum communication systems. In a first embodiment of the present invention, the channel parameters are estimated from the common pilot channel directly if it is stronger than all other interfering signals. If stronger interfering signals are detected, their effect on the common pilot channel is suppressed in an iterative manner. The suppression iterations are repeated until the common user pilot channel becomes the strongest signal. This leads to a more accurate estimate of the channel parameters.

In a second embodiment of the present invention, the detected interferers are used in a constructive manner to improve the estimated channel parameters. In this embodiment, the channel amplitude and phase are not estimated only from the common pilot channel, but also from the strongest interferers symbols, if any. This can be done because both the desired user's signal and all the interfering users' signals pass through the same wireless channel. The final channel parameters are the weighted average between those obtained from the common user's pilot channel and the strongest interfering signals. The received signal is unscrambled and processed. An initial estimate is made based on the common pilot channel. If the common pilot channel happens to be stronger than the interfering signals, then the previously estimated parameters are used in the demodulation process. If the interfering signals are stronger, then the strongest interferers are detected, as well as the effective spreading codes. Then, the channel is estimated from the interfering signals. The channel estimate from the common pilot channel and the channel estimate from the interfering signals are weight-averaged, resulting in a more accurate channel parameter. It is also possible to incorporate the iterative aspects of the first embodiment of the present invention into the second embodiment.

The present invention also provides a method for estimating channel parameters from a communications signal containing interference by receiving a communications signal, generating a baseband signal from the communications signal, processing the baseband signal, selecting a maximum signal from the baseband signal, suppressing the interference when the maximum signal is not stronger than the interference, and generating an estimate of the channel parameters from the maximum signal when the maximum signal is stronger than the interference. This method may be accomplished using a computer program embodied on a computer readable medium.

Alternatively, the present invention provides a method for estimating channel parameters from a communications signal containing interference by receiving a communications signal, generating a baseband signal from the communications signal, processing the baseband signal to produce a first signal and a second signal, estimating a first channel parameter from the first signal and a second channel parameter from the second signal, suppressing the interference using a weighted average of the first channel parameter and the second channel parameter, repeating the steps of estimating the first and second channel parameters and suppressing the interference when the first signal is not stronger than the interference, and generating an estimate of the channel parameters from the first signal when the first signal is stronger than the interference. This method may be accomplished using a computer program embodied on a computer readable medium.

In addition, the present invention provides an apparatus that includes an interference canceler coupled to a channel emulator, a descrambler coupled to the interference canceler, a correlator coupled to the descrambler, a channel estimator coupled to the correlator, a maximal ratio combiner coupled to the correlator and the channel estimator, a symbol estimator and interferer sequence detector coupled to the maximal ratio combiner, a signal spreader coupled to the symbol estimator and interferer sequence detector, and a scrambler coupled to the signal spreader. The channel emulator coupled to the scrambler and the channel estimator.

The present invention also provides a communications device having an antenna, a receiver coupled to the antenna, a transmitter coupled to the antenna, a controller coupled to the receiver and the antenna, a display coupled to the controller, a speaker coupled to the controller, a memory coupled to the controller, a microphone coupled to the controller, and a keypad coupled to the controller. The receiver includes a radio frequency to baseband converter coupled to the antenna, and a channel parameter estimator coupled to the baseband converter and the controller. The channel parameter estimator includes an interference canceler coupled to a channel emulator and the radio frequency to baseband converter, a descrambler coupled to the interference canceler, a correlator coupled to the descrambler, a channel estimator coupled to the correlator, a maximal ratio combiner coupled to the correlator, the channel estimator and the controller, a symbol estimator and interferer sequence detector coupled to the maximal ratio combiner, a signal spreader coupled to the symbol estimator and interferer sequence detector, a scrambler coupled to the signal spreader, and the channel emulator coupled to the scrambler and the channel estimator.

Moreover, the present invention provides an apparatus for estimating channel parameters from a communications signal having a descrambler, a correlator coupled to the descrambler, a first channel estimator coupled to the correlator, a second channel estimator coupled to the correlator, a channel averaging device coupled to the first channel estimator and the second channel estimator, a maximal ratio combiner coupled to the correlator and the channel averaging device, and a symbol estimator and interferer sequence detector coupled to the maximal ratio combiner, the first channel estimator and the second channel estimator.

In addition, the present invention provides a communications device having an antenna, a receiver coupled to the antenna, a transmitter coupled to the antenna, a controller coupled to the receiver and the antenna, a display coupled to the controller, a speaker coupled to the controller, a memory coupled to the controller, a microphone coupled to the controller, and a keypad coupled to the controller. The receiver includes a radio frequency to baseband converter coupled to the antenna, and a channel parameter estimator coupled to the baseband converter and the controller. The channel parameter estimator includes a descrambler to the radio frequency to baseband converter, a correlator coupled to the descrambler, a first channel estimator coupled to the correlator, a second channel estimator coupled to the correlator, a channel averaging device coupled to the first channel estimator and the second channel estimator, a maximal ratio combiner coupled to the correlator and the channel averaging device, and a symbol estimator and interferer sequence detector coupled to the controller, the maximal ratio combiner, and the first channel estimator and the second channel estimator.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The discussion herein relates to wireless communication systems, and more particularly, to wireless code division multiple access (CDMA) systems, for example, systems conforming to the IS-95 standards or to proposed standards for third-generation wideband CDMA (WCDMA, IS-2000, and the like). In such wireless communication systems, an antenna radiates electromagnetic waveforms generated by a transmitter located, for example, in a mobile terminal or base station. The waveforms are propagated in a radio propagation environment, and are received by a receiver via one or more antennas. It will be understood that, although the description herein refers to a radio environment, the present invention is applicable to other environments, such as wireline communications.

The exemplary embodiments described herein also are preferably applied to interference cancellation for a wireless downlink channel, i.e., a channel conveying information from a base station of a wireless cellular system to a terminal, and to apparatus and methods that may be implemented in a wireless communications terminal, for example, a cellular radiotelephone, wireless capable personal digital assistant (PDA) or similar wireless communications device. It will be appreciated, however, that the present invention may be used in other environments, e.g., in other types of wireless receiver applications or in wireline receiver applications.

Figure 1:
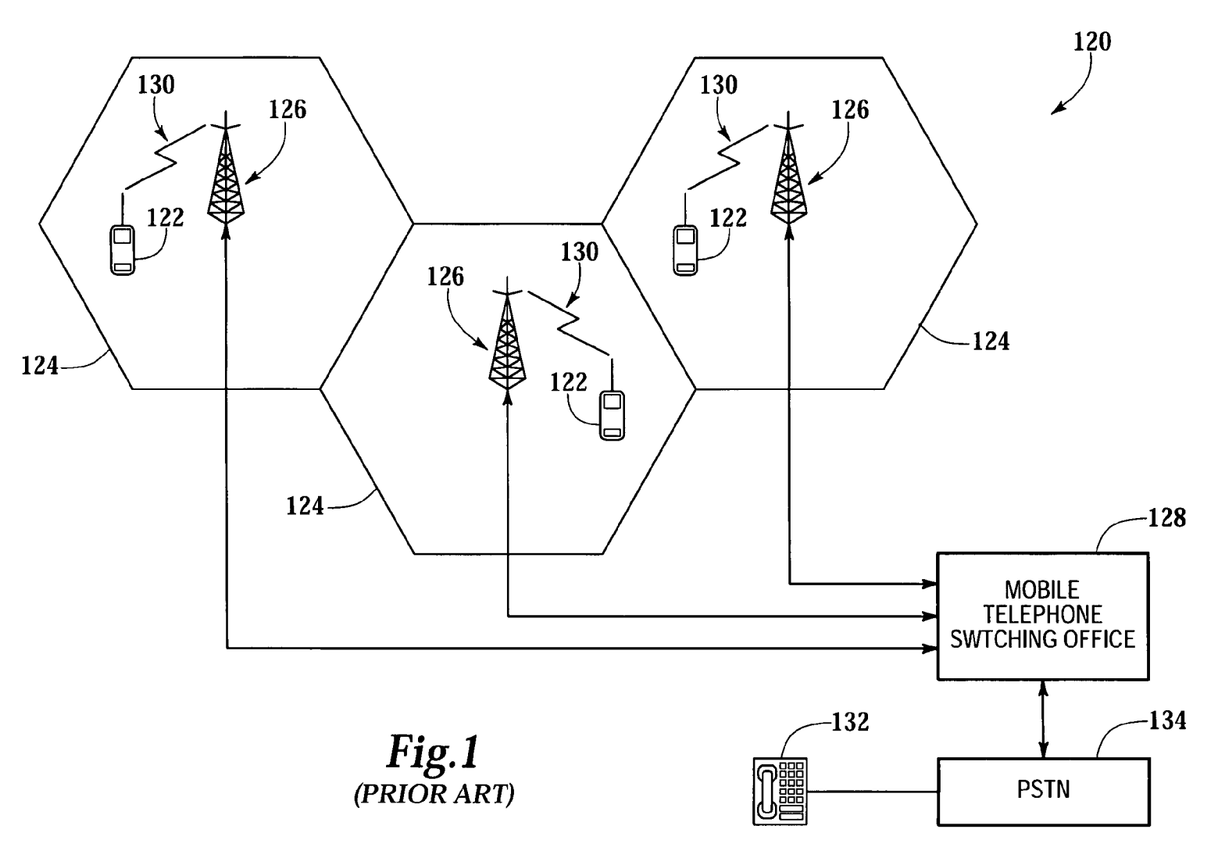
FIG. 1 is a schematic diagram illustrating a conventional terrestrial cellular communication system in accordance with the prior art.

FIG. 1 illustrates a typical terrestrial cellular radiotelephone communication system 120 in accordance with the prior art. The cellular radiotelephone system 120 may include one or more radiotelephones (terminals) 122, communicating with a plurality of cells 124 served by base stations 126 and a mobile telephone switching office (MTSO) 128. Although only three cells 124 are shown in FIG. 1, a typical cellular network may include hundreds of cells, may include more than one MTSO, and may serve thousands of radiotelephones.

The cells 124 generally serve as nodes in the communication system 120, from which links are established between radiotelephones 22 and the MTSO 128, by way of the base stations 126 serving the cells 124. Each cell 124 will have allocated to it one or more dedicated control channels and one or more traffic channels. A control channel is a dedicated channel used for transmitting cell identification and paging information. The traffic channels carry the voice and data information. Through the cellular network 120, a duplex radio communication link may be effected between two mobile terminals 122 or between a mobile terminal 122 and a landline telephone user 132 through a public switched telephone network (PSTN) 134. The function of a base station 126 is to handle radio communication for a cell 124. In this capacity, a base station 126 functions as a relay station for data and voice signals.

Figure 2:
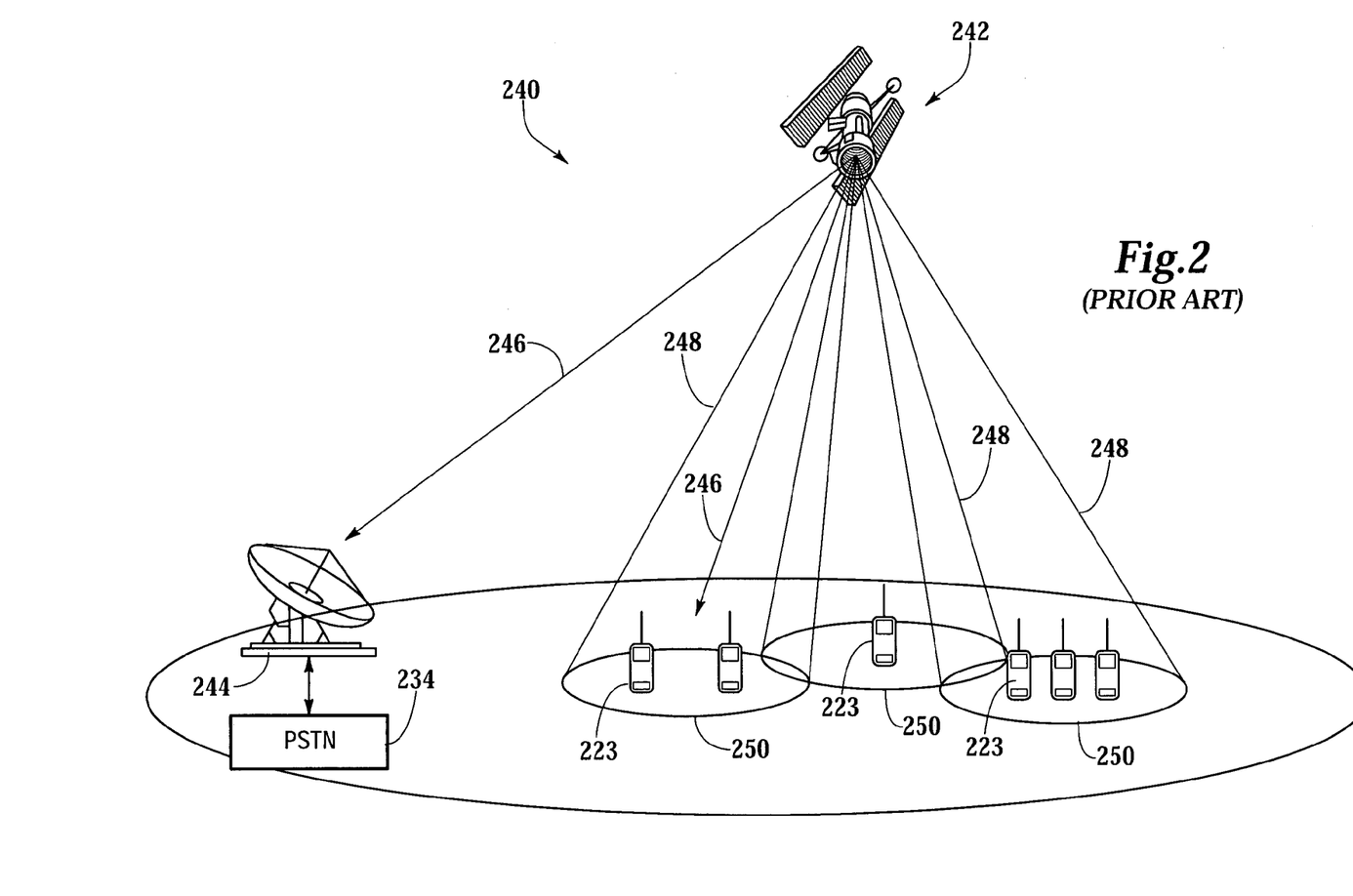
FIG. 2 is a schematic diagram illustrating a conventional satellite based wireless communication system in accordance with the prior art.

As illustrated in the prior art FIG. 2, a satellite 242 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 240 typically includes one or more satellites 242 that serve as relays or transponders between one or more earth stations 244 and terminals 223. The satellite conveys radiotelephone communications over duplex links 246 to terminals 223 and an earth station 244. The earth station 244 may in turn be connected to a public switched telephone network 234, allowing communications between satellite radiotelephones, and communications between satellite radio telephones and conventional terrestrial cellular radiotelephones or landline telephones. The satellite radiotelephone system 240 may utilize a single antenna beam covering the entire area served by the system, or, as shown, the satellite may be designed such that it produces multiple minimally-overlapping beams 248, each serving distinct geographical coverage areas 250 in the system's service region. The coverage areas 250 serve a similar function to the cells 124 of the terrestrial cellular system 120 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communication channels, wherein discrete frequency bands serve as channels over which cellular terminals communicate with cellular base stations. Typically, these bands are reused in geographically separated cells in order to increase system capacity.

Modem digital wireless systems utilize different multiple access techniques such as TDMA and/or CDMA to provide increased spectral efficiency. In TDMA systems, such as those conforming to GSM or IS-136 standards, carriers are divided into sequential time slots that are assigned to multiple channels such that a plurality of channels may be multiplexed on a single carrier. CDMA systems, such those conforming to IS-95 standard, achieve increased channel capacity by using "spread spectrum" techniques wherein a channel is defined by modulating a data-modulated carrier signal by a unique spreading code (i.e., a code that spreads an original data-modulated carrier over a wide portion of the frequency spectrum in which the communication systems operates).

Now turning to the present invention, the present invention incorporates some aspects of channel estimation as described in application Ser. No. 09/364,169 to Madkour, et al. filed Jul. 30, 1999 assigned to the assignee of the present application. The method described therein involves estimating the user's spreading codes and then using them to suppress the interference from the received signal. The modified received signal is then used to find a better estimate of the spreading codes used by other users. The channel parameters were estimated directly from the received pilot of the desired user.

Figure 3:
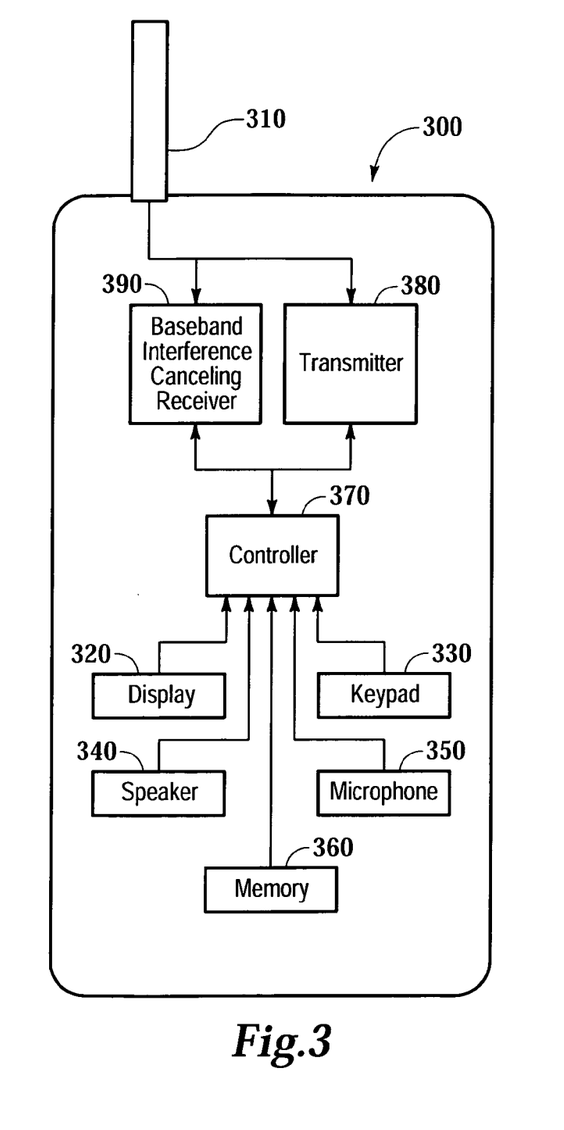
FIG. 3 is a schematic diagram illustrating a wireless terminal in which an apparatus and methods according to the present invention can be implemented.

FIG. 3 illustrates an exemplary wireless terminal 300 in which methods and apparatus according to the present invention may be embodied. The terminal 300 includes a controller 370, such as a microprocessor, microcontroller or similar data processing device, that executes program instructions stored in a memory 360, such as a dynamic random access memory (DRAM), electrically erasable programmable read only memory (EEPROM) or other storage device. The controller 370 is operatively associated with user interface components such as a display 320, keypad 330, speaker 340, and microphone 350, operations of which are known to those of skill in the art and will not be further discussed herein. The controller 370 also controls and/or monitors operations of a radio transmitter 380 that, for example, transmits radio frequency (RF) signals in a communications medium via an antenna 310. The controller 370 is also operatively associated with a baseband interference canceling receiver 390.

Figure 4:
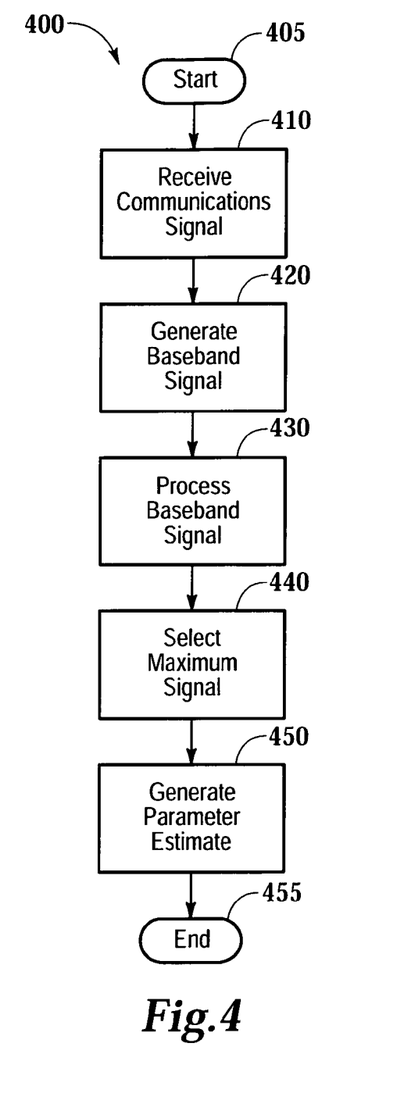
FIG. 4 is a flowchart illustrating overall operation of the present invention.
Figure 5:
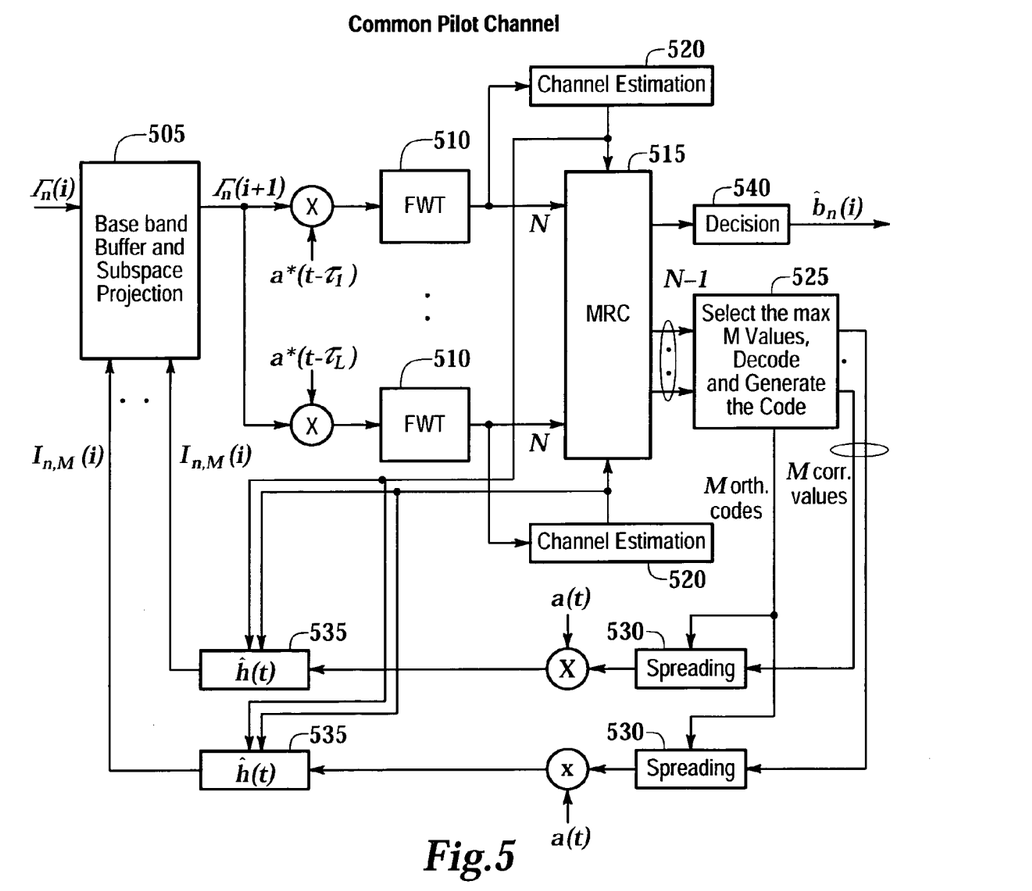
FIG. 5 is a block diagram illustrating a first embodiment of the present invention.
Figure 6:
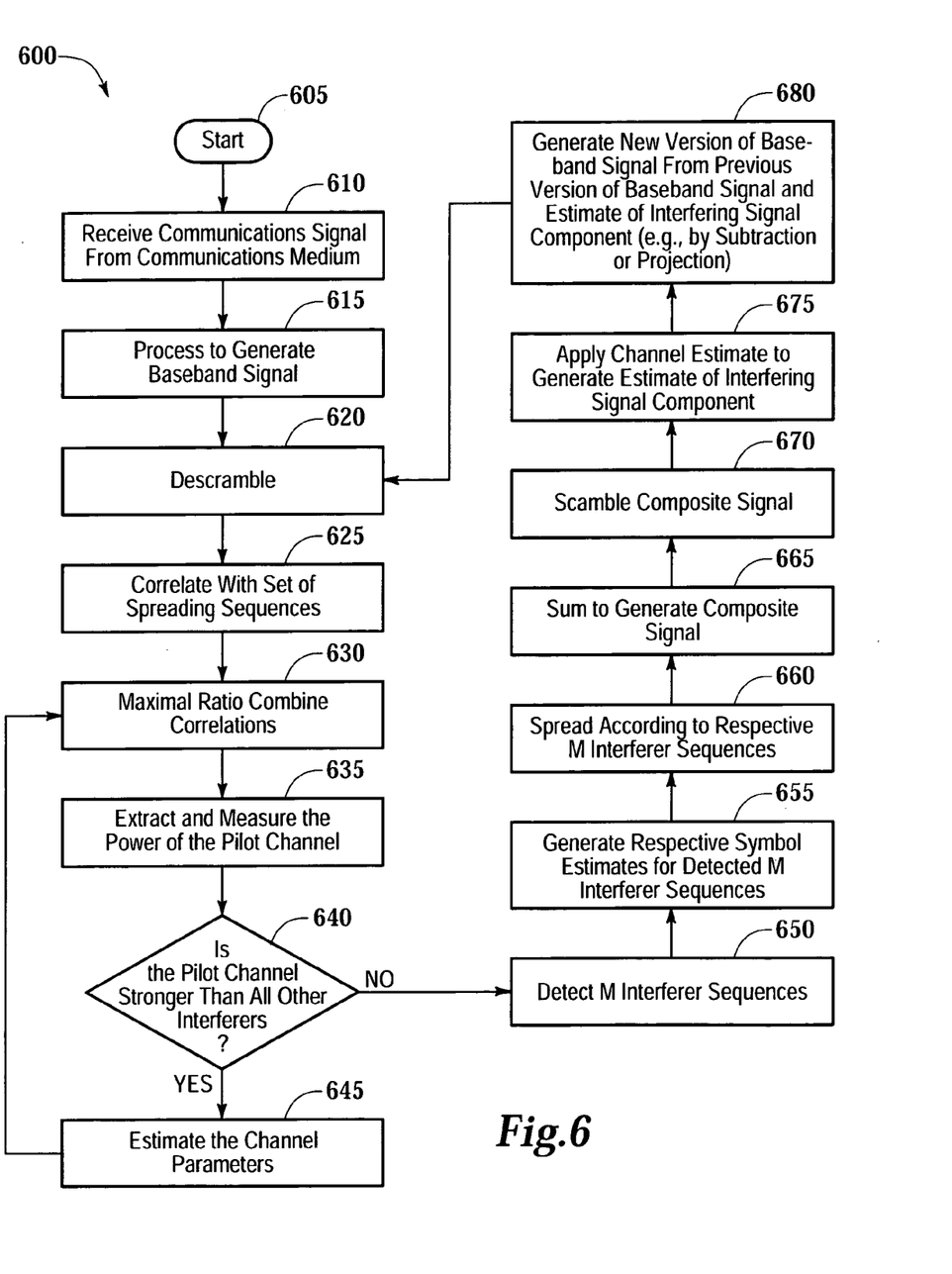
FIG. 6 is a flowchart illustrating operation of a first embodiment of the present invention.
Figure 7:
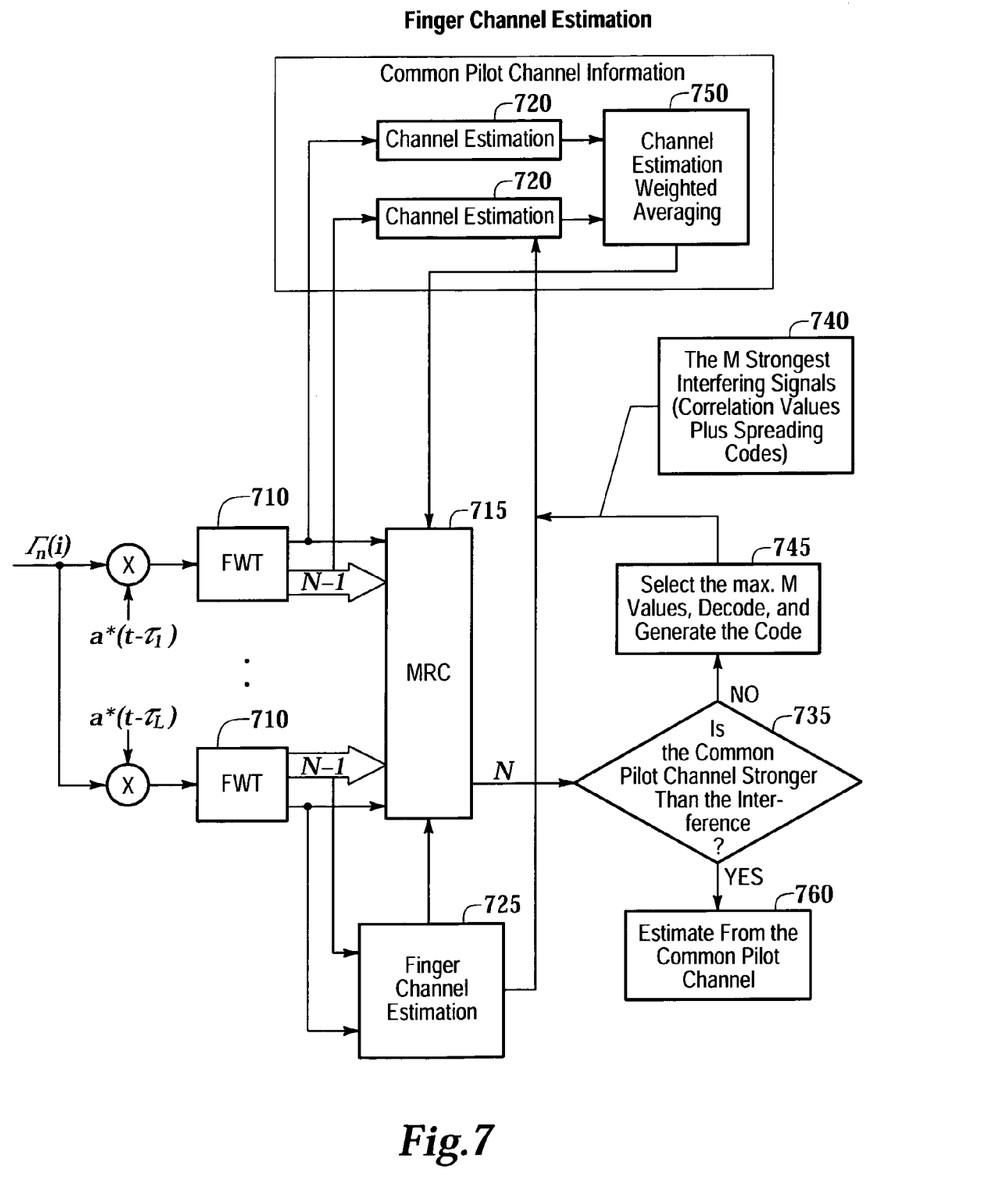
FIG. 7 is a block diagram illustrating a second embodiment of the present invention.
Figure 8:
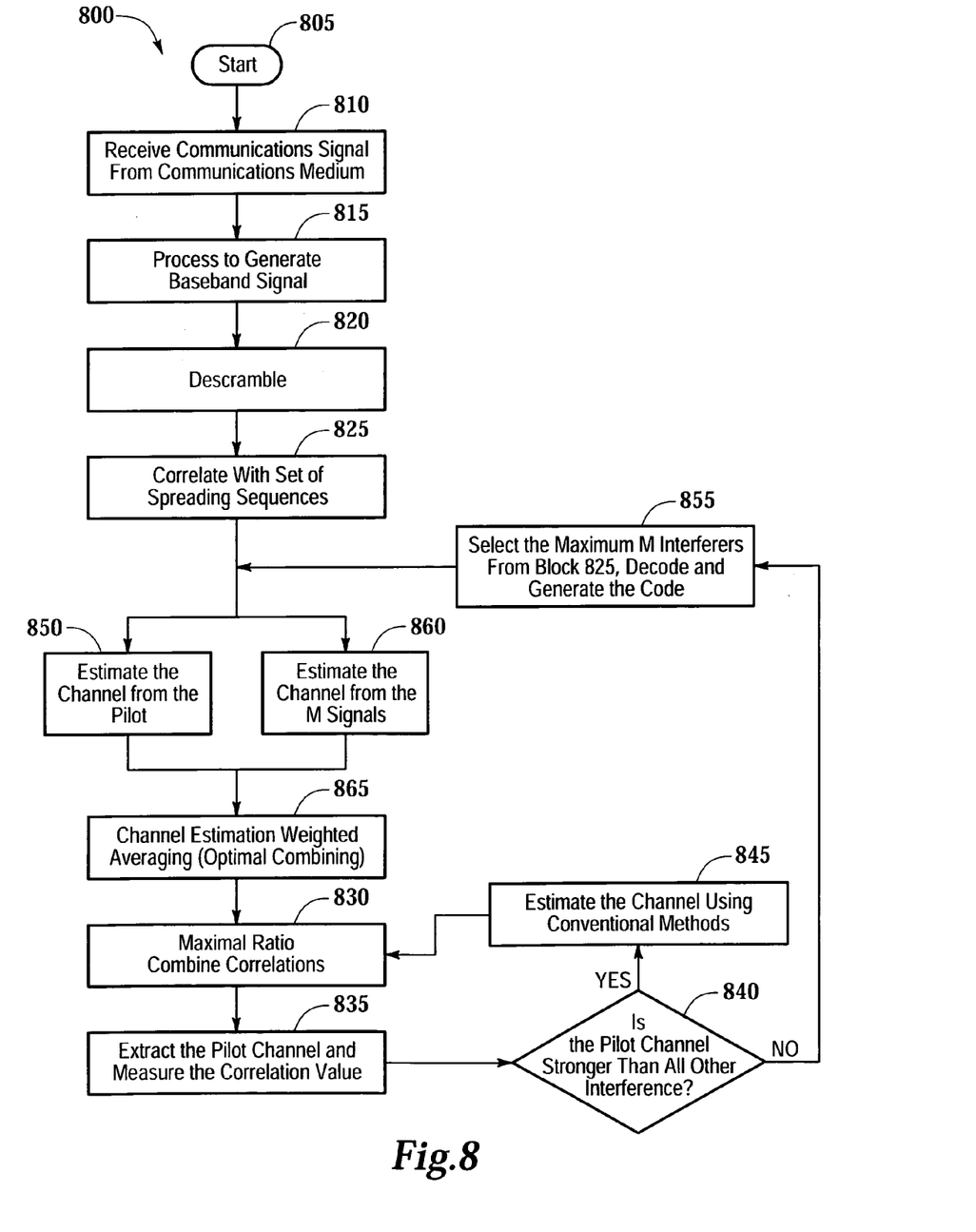
FIG. 8 is a flowchart illustrating operation of a second embodiment of the present invention.

FIGS. 4, 6 and 8 described herein are flowchart illustrations of exemplary operations according to various embodiments of the present invention. It will be understood that blocks of these flowcharts, and combinations of blocks in these flowcharts, can be implemented by computer program instructions which may be loaded and executed on a computer or other programmable data processing apparatus, such as a microcomputer, microprocessor, ASIC, DSP chip or other processing circuitry used to implement apparatus, such as the apparatus described herein with reference to FIGS. 5 and 7, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 4, 6 and 8 support combinations of means for performing the specified functions and combinations of steps for performing the specified functions. It will also be understood that each block of the flowcharts of FIGS. 4, 6 and 8, and combinations of blocks therein, can be implemented by special purpose hardware-based computer systems which perform the specified functions or steps, or combinations of special purpose hardware and computer instructions.

FIG. 4 illustrates overall operation 400 of the present invention. The present invention starts in block 405. A communications signal is received in block 410 and processed to generate a baseband signal in block 420. The baseband signal is then processed in block 430. In block 440, the maximum signal is selected from the processed baseband signal. Finally, a parameter estimate is made in block 450 based on the selected maximum signal from block 440. Finally, processing terminates in block 455.

FIG. 5 illustrates a first embodiment of the present invention, like numbers denote like elements. A base station communications signal is received and processed in block 505. In block 510, a fast Walsh transformation (FWT) is performed to detect the spreading codes. The FWT is performed for each finger of the receiver. The fingers' delays are assumed to be known. The fingers are combined in the maximum ratio combiner (MRC) in block 515. If the common pilot channel is not the strongest signal, then an attempt is made to suppress the interferers. The maximum M values (interferers) are selected, decoded and then coded in block 525. The results from block 525 are then spread according to the respective M interferer sequences in block 530. An estimated version of the channel is generated in block 535. This estimated version is fedback to block 505. The entire system repeats itself until the common pilot signal is the strongest. Once the common pilot signal is determined to be the strongest, channel estimations are made in block 520. The results are available at block 540.

FIG. 6 illustrates operation 600 of a first embodiment of the present invention. The present invention starts in block 605. A communications signal is received in block 610 and processed to produce a baseband signal in block 615. The baseband signal is descrambled in block 620 and correlated with a set of spreading sequences in block 625. The correlations produced are then maximal ratio combined (MRC) in block 630. From this, the power of the common pilot channel is extracted and measured in block 635. A check is performed in block 640 to determine if the common pilot channel is the strongest signal. If the common pilot channel is the strongest signal, then the channel parameters may be estimated using conventional estimation methods in block 645. The results of block 645 are fedback to block 630.

If the common pilot channel does not have the strongest signal, an attempt is made to cancel the interference on the pilot. The M interferer sequences are detected in block 650 from the results of block 630. Next, the present invention generates respective symbol estimates in block 655 for the detected M interferer sequences from block 650. The results of block 655 are then spread according to the respective M interferer sequences in block 660. Next, the respective spread signals are summed to generate a composite signal in block 665. The composite signal is scrambled in block 670. A channel estimate is then applied to the scrambled composite signal to generate an estimate of a composite interfering component of the baseband signal in block 675. The estimate of the interfering signal component is then used to generate a new version of the baseband signal in block 680. The new version of the baseband signal is then subjected to further processing to generate an estimate of the desired information in blocks 620–635. This process is repeated iteratively until the common pilot channel is stronger than all the interferers and the channel can be estimated from the common pilot channel using conventional methods.

A number of different techniques may be used in block 680 to modify the current version of the baseband signal based on the estimate of the interfering signal component. For example, the estimate of the interfering signal component may be subtracted from the current version of the baseband signal, or a projection technique may be employed wherein a projection of the current baseband signal in a direction orthogonal to the estimate of the interfering signal component is made. Gram-Schmidt orthogonalization techniques may be used to compute such a projection.

For the subtraction technique, limited simulations conducted by the inventors indicate that it is preferable to cancel a few interferers at each iteration to avoid an "over-cancellation" phenomenon. Generally, the projection technique may be more complex than the subtraction technique, but the simulation results indicate that it can produce improved performance (e.g., an increase in potential system capacity for a given error rate or a decrease in error rate for a given system capacity) and reduced likelihood of over-cancellation. Using the projection technique, the total number of iterations and the number of interferers canceled at a time can be varied to affect performance.

FIG. 7 illustrates a second embodiment of the present invention. An initial channel estimation is made from the common pilot channel in block 720. Each finger of the receiver is Fast Walsch Transformed (FWT) in block 710, again assuming that the finger delays are known. A finger channel estimation is made in block 725. The fingers are combined by the maximum ratio combiner (MRC) in block 715. The MRC has been initially set according to the estimation parameters from the common pilot channel. If the common pilot channel is determined to be stronger than the interfering signals in block 735, then the previously estimated parameters are used in the demodulation process in block 760. Otherwise, the maximum M values are selected, decoded and coded in block 745. Channel estimations are made on the results of block 745. The channel estimations are all weight-averaged in block 750 to get the optimum channel estimate. This is then feedback to the MRC in block 715.

FIG. 8 illustrates operation 800 of a second embodiment of the present invention. The present invention starts in block 805. A communications signal is received in block 810 and processed to produce a baseband signal in block 815. The baseband signal is descrambled in block 820 and correlated with a set of spreading sequences in block 825. A channel estimate is made from the M signals in block 860 and a channel estimate is made from the common pilot in block 850. The channel estimates are then weight-averaged in block 865. The results of block 865 are then fed to the maximum ratio combiner (MRC) in block 830. The results of block 830, the common pilot channel is extracted and it correlation value measured in block 835. A check is performed in block 840 to determine if the common pilot channel is the strongest signal. If the common pilot channel is the strongest signal, then the channel parameters may be estimated using conventional estimation methods in block 845. The results of block 845 are fed back to block 830.

If the common pilot channel is not stronger than the interference the maximum M interferers out of block 825 are selected, decoded and then coded in block 855. A channel estimate of the M signals is made in block 860 and a channel estimate from the common pilot are made in block 850. The channel estimate made from the M signals in block 860 and the channel estimate made from the common pilot in block 850 are then weight-averaged in block 865. The results of block 865 are then fed back to the maximum ratio combiner (MRC) in block 830 and the process continues as previously described.

Although preferred embodiments of the present invention have been described in detail, it will be understood by those skilled in the art that various modifications can be made therein without departing from the spirit and scope of the invention as set forth in the appended claims.

What is claimed is:

1. A method for estimating channel parameters from a communications signal containing interference, the method comprising the steps of:
   receiving a communications signal;
   generating a baseband signal from the communications signal;
   processing the baseband signal by
      descrambling the baseband signal;
      correlating the descrambled baseband signal with a set of spreading sequences; and
      performing maximum ratio combination correlations on the descrambled baseband signal and the set of spreading sequences;
   selecting a maximum signal from the baseband signal;
   suppressing the interference when the maximum signal is not stronger than interference; and
   generating an estimate of the channel parameters from the maximum signal when the maximum signal is stronger than the interference.

2. The method as recited in claim 1 wherein the maximum signal comprises a common pilot channel.

3. The method as recited in claim 1 wherein the maximum signal comprises interfering signal components.

4. The method as recited in claim 1 wherein the step of suppressing the interference further comprises the steps of:
   detecting one or more interference sequences;
   generating a symbol estimate for each of the one or more interference sequences;
   spreading the symbol estimate for each of the one or more interference sequences;
   summing the spread symbol estimate for each of the one or more interference sequences to generate a composite signal;
   scrambling the composite signal;
   applying a channel estimate to generate an estimate of an interfering signal component of the composite signal; and
   generating a new version of the baseband signal from a previous version of the baseband signal and the estimate of an interfering signal component of the composite signal.

5. The method as recited in claim 1 further comprising the step of repeating the steps of processing the baseband signal, selecting the maximum signal from the baseband signal and suppressing the interference until the maximum signal is stronger than the interference.

6. A method for estimating channel parameters from a communications signal containing interference, the method comprising the steps of:
- receiving a communications signal;
- generating a baseband signal from the communications signal;
- processing the baseband signal to produce a first signal and a second signal;
- estimating a first channel parameter from the first signal and a second channel parameter from the second signal;
- suppressing the interference using a weighted average of the first channel parameter and the second channel parameter;
- repeating the steps of estimating the first and second channel parameters and suppressing the interference when the first signal is not stronger than interference; and
- generating an estimate of the channel parameters from the first signal when the first signal is stronger than the interference.

7. The method as recited in claim 6 wherein the step of processing the baseband signal further comprises the steps of:
- descrambling the baseband signal; and
- correlating the descrambled baseband signal with a set of spreading sequences.

8. The method as recited in claim 6 wherein the step of suppressing the interference further comprises the steps of:
- generating an estimate of the channel parameters using a weighted average of the first channel parameter and the second channel parameter;
- performing maximum ratio combination correlations on the processed baseband signal and the set of spreading sequences; and
- selecting a new first signal using the maximum ratio combination correlations.

9. The method as recited in claim 6 wherein the first signal comprises a common pilot channel.

10. The method as recited in claim 6 wherein the second signal comprises interfering signal components.

11. The method as recited in claim 6 wherein the step of repeating the steps of estimating the first and second channel parameters and suppressing the interference when the first signal is not stronger the interference further comprises the step of selecting the second signal from a maximum signal of the processed baseband signal.

12. An apparatus for estimating channel parameters from a communications signal comprising:
- a descrambler;
- a correlator coupled to the descrambler a first channel estimator coupled to the correlator;
- a second channel estimator coupled to the correlator;
- a channel averaging device coupled to the first channel estimator and the second channel estimator;
- a maximal ratio combiner coupled to the correlator and the channel averaging device; and
- a symbol estimator and interferer sequence detector coupled to the maximal ratio combiner, the first channel estimator and the second channel estimator.

13. A communications device comprising:
- an antenna;
- a receiver coupled to the antenna;
- a transmitter coupled to the antenna;
- a controller coupled to the receiver and the transmitter;
- a display coupled to the controller;
- a speaker coupled to the controller;
- a memory coupled to the controller;
- a microphone coupled to the controller;
- a keypad coupled to the controller;
- the receiver comprising a radio frequency to baseband converter coupled to the antenna, a channel parameter estimator coupled to the baseband converter and the controller; and
- the channel parameter estimator comprising a descrambler to the radio frequency to baseband converter, a correlator coupled to the descrambler, a first channel estimator coupled to the correlator, a second channel estimator coupled to the correlator, a channel averaging device coupled to the first channel estimator and the second channel estimator, a maximal ratio combiner coupled to the correlator and the channel averaging device, and a symbol estimator and interferer sequence detector coupled to the controller, the maximal ratio combiner, the first channel estimator and the second channel estimator.

14. A computer program embodied on a computer readable medium for estimating channel parameters from a communications signal containing interference, the computer program comprising:
- a code segment for receiving a communications signal;
- a code segment for generating a baseband signal from the communications signal;
- a code segment for processing the baseband signal utilizing
  - a code segment for descrambling the baseband signal;
  - a code segment for correlating the descrambled baseband signal with a set of spreading sequences; and
  - a code segment for performing maximum ratio combination correlations on the descrambled baseband signal and the set of spreading sequences;
- a code segment for selecting a maximum signal from the baseband signal;
- a code segment for suppressing the interference when the maximum signal is not stronger than interference; and
- a code segment for generating an estimate of the channel parameters from the maximum signal when the maximum signal is stronger than the interference.

15. The computer program as recited in claim 14 wherein the maximum signal comprises a common pilot channel.

16. The computer program as recited in claim 14 wherein the maximum signal comprises interfering signal components.

17. The computer program as recited in claim 14 wherein the code segment for suppressing the interference further comprises the steps of:
- a code segment for detecting one or more interference sequences;
- a code segment for generating a symbol estimate for each of the one or more interference sequences;
- a code segment for spreading the symbol estimate for each of the one or more interference sequences;
- a code segment for summing the spread symbol estimate for each of the one or more interference sequences to generate a composite signal;
- a code segment for scrambling the composite signal;
- a code segment for applying a channel estimate to generate an estimate of an interfering signal component of the composite signal; and
- a code segment for generating a new version of the baseband signal from a previous version of the baseband signal and the estimate of an interfering signal component of the composite signal.

18. The computer program as recited in claim 14 further comprising a code segment for repeatedly processing the baseband signal, selecting the maximum signal from the baseband signal and suppressing the interference until the maximum signal is stronger than the interference.

19. A computer program embodied on a computer readable medium for estimating channel parameters from a communications signal containing interference, the computer program comprising:

a code segment for receiving a communications signal;

a code segment for generating a baseband signal from the communications signal;

a code segment for processing the baseband signal to produce a first signal and a second signal;

a code segment for estimating a first channel parameter from the first signal and a second channel parameter from the second signal;

a code segment for suppressing the interference using a weighted average of the first 11 channel parameter and the second channel parameter;

a code segment for repeating the steps of estimating the first and second channel parameters and suppressing the interference when the first signal is not stronger than interference; and a code segment for generating an estimate of the channel parameters from the first signal when the first signal is stronger than the interference.

20. The computer program as recited in claim 19 wherein the code segment for processing the baseband signal further comprises:

a code segment for descrambling the baseband signal; and a code segment for correlating the descrambled baseband signal with a set of spreading sequences.

21. The computer program as recited in claim 19 wherein the code segment for suppressing the interference further comprises:

a code segment for generating an estimate of the channel parameters using a weighted average of the first channel parameter and the second channel parameter;

a code segment for performing maximum ratio combination correlations on the processed baseband signal and the set of spreading sequences; and a code segment for selecting a new first signal using the maximum ratio combination correlations.

22. The computer program as recited in claim 19 wherein the first signal comprises a common pilot channel.

23. The computer program as recited in claim 19 wherein the second signal comprises interfering signal components.

24. The computer program as recited in claim 19 wherein the code segment for repeatedly estimating the first and second channel parameters and suppressing the interference when the first signal is not stronger the interference further comprises a code segment for selecting the second signal from a maximum signal of the processed baseband signal.

* * * * *